United States Patent Office 3,397,103
Patented Aug. 13, 1968

3,397,103
CHLOROTRIFLUOROETHYLENE COPOLYMER
SOLVENT SYSTEMS
Julian H. Kushnick, Brooklyn, N.Y., and Whitney H. Mears, Morris Plains, and Edward S. Jones, Hanover Township, Morris County, N.J., assignors to Allied Chemical Corporation, New York, N.Y., a corporation of New York
No Drawing. Filed Apr. 21, 1964, Ser. No. 361,567
16 Claims. (Cl. 156—307)

ABSTRACT OF THE DISCLOSURE

Chlorotrifluoroethylene-vinylidene fluoride copolymers and chlorotrifluoroethylene - vinylidene fluoride - tetrafluoroethylene terpolymers are dissolved in hexafluorobenzene to form solutions which are adapted for casting unsupported films and coatings.

This invention relates to novel chlorotrifluoroethylene (CTFE) copolymer solvent systems, casting unsupported films and coatings from these novel solvent systems, and to the novel solutions used therein.

CTFE copolymers can be used to provide films and coatings which are chemically nonreactive, e.g., resistant to oxidation and corrosion and flexible. The films are useful in packaging and the coatings are useful for chemical process equipment and piping; plastic and metal containers; as liners for plastic bottles such as those made of polyethylene; plastic films to reduce water and gas permeabilities; for manufacture of complicated film shapes by coating buildup on forms; moisture resistant coating of chemical products; and for solid state semiconductors such as transistors and resistors.

The CTFE copolymers are also useful in the preparation of solvent-dopes, which are used to seam tanks and containers lined with CTFE copolymers similar to those used in the solvent-dope and in the protection of cut ends, connection points, etc., of electrical heating tapes, which are jacketed with CTFE copolymers similar to those used in the solvent-dope.

The CTFE copolymer solutions find utility in determining the various physical properties and structures of the polymers dissolved therein, e.g., the degree of polymerization can be determined through solution vicosity measurements and the polymer structure can be determined by NMR spectra of the solutions.

Heretofore, there has been no method for casting CTFE copolymers at ambient temperatures and, further, it has been found impossible to hold these copolymers in solution at these ambient temperatures. Previous solvent systems required elevated temperatures of at least 100° C. for casting or maintaining the copolymer in solution.

Solvents such as 2,5-dichlorobenzotrifluoride, orthochlorobenzotrifluoride and orthobenzotrifluoride have been used in these systems and it has been observed that at ambient temperatures the solution converts to a gel, which is useless in the casting process. It was also found that casting from solution at high temperatures produced films and coatings of high crystallinity, undesirable permeability characteristics, and poor clarity. The necessity of maintaining these copolymers in solution at temperatures greater than 100° C. prevented or, at least, hampered advance preparation of solutions for industrial consumption at geographical locations removed from those of origin. Where dispersion systems were used instead of solvent systems, prolonged baking, a requisite of the dispersion systeem, resulted in degradation of the copolymers. In general, casting continuous smooth unsupported film of thin gauge and good clarity has been difficult.

An object of this invention is to provide a method for casting unsupported substantially amorphous films of thin gauge and good clarity and coatings of CTFE copolymers from a novel solvent system at ambient temperatures. A further object is to provide a method of casting wherein the solvent can be eliminated from the film or coating at ambient temperatures. Still a further object is to provide a method of casting CTFE copolymers whereby the film or coating will be continuous and nonporous. Another object is to provide a CTFE copolymer solvent system which is novel and simple. Still another object is to provide novel solutions of CTFE copolymers which will remain in solution at ambient temperatures. Other objects and advantages will be apparent hereinafter.

In accordance with the invention a solution has been prepared comprising: (a) a member selected from the group consisting of a copolymeer consisting essentially of CTFE and vinylidene fluoride and a terpolymer (except as otherwise noted, it is intended that the term "copolymer" hereinafter include the terpolymer) consisting essentially of CTFE, vinylidene fluoride, and tetrafluoroethylene and (b) hexafluorobenzene ($C_6F_6$, B.P. 81.5° C.).

The solution is prepared by admixing the copolymer with the hexafluorobenzene at temperatures ranging from 10° to 100° C. and preferably from 50° to 80° C., the characteristics of the particular copolymer and the ratio of solids to solvent determining the temperature and time necessary for speedy and complete solution of the copolymer. This solution is availed of in a method for casting unsupported films of the CTFE copolymer comprising the steps: (a) dissolving the CTFE copolymer in hexafluorobenzene; (b) depositing the solution of CTFE copolymer and hexafluorobenzene on a substrate; (c) drying the solution to remove the hexafluorobenzene, and (d) removing the CTFE copolymer film from the substrate. The CTFE copolymer-hexafluorobenzene solution is also used in a method for casting coatings comprising: (a) dissolving the CTFE copolymer in hexafluorobenzene; (b) depositing the solution of CTFE copolymer and hexafluorobenzene on a substrate; and (c) drying the solution of CTFE copolymer and hexafluorobenzene on the substrate to remove the hexafluorobenzene.

The CTFE copolymers can be prepared by conventional copolymerization techniques such as those described in U.S. Patents 2,738,343 and 2,468,054.

The preparation of hexafluorobenzene is described in Fieser et al., Advanced Organic Chemistry, Reinhold Publishing Corp., 1961, p. 787 and U.S. Patent 2,461,554.

The CTFE copolymers are exemplified by those in which the CTFE can be about 60% to 99.5% by weight and is preferably about 95% to about 99.05% by weight. The vinylidene fluoride can be about 0.5% to about 40% by weight and is preferably about 0.95% to about 5% by weight. In the terpolymer, the same percentage range is applicable for the CTFE and vinylidene fluoride except that about 1% to about 5% by weight of tetrafluoroethylene, and preferably about 2.5% to about 2.7% by weight of tetrafluoroethylene, replaces an equivalent amount by weight of CTFE or vinylidene fluoride.

A characteristic of CTFE, vinylidene fluoride, and tetrafluoroethylene is that their homopolymers are insoluble in hexafluorobenzene.

The molecular weight of the copolymer can range from 100,000 to 1,000,000 and preferably ranges from 150,000 to 500,000, the molecular weight being measured by dilute solution viscosity (ASTM D-1430-58T); however, the molecular weights of the copolymers are not critical, the criteria being the selection of the copolymer which can be converted to a film or coating appropriate for the intended use.

The percentage of copolymer, which can be practically and efficiently dissolved in hexafluorobenzene can range from about 1% to about 60% by weight, the copolymer generally being in particulate form. This percentage may be referred to as "percent solids." As the percent solids increases the viscosity of the solution increases. The high viscosity solutions (e.g., 50% solids) are particularly adaptable to caulking. As noted, the time and temperature for solution is dependent upon the characteristics of the particular copolymer and the percent solids; however, all of the copolymers remain in solution at ambient temperatures and can be cast at ambient temperatures, as low as 0° C.

Typical films which can be cast from these solutions are 0.1 to 5 mils in a single cast, but films of greater thickness can be built up. It has been found that a solution of 5% solids gives a highly desirable film of 0.2 mils. The preferred substrate used in the preparation of the films is chrome plated steel, but other metallic or vitreous substrates, which are smooth and non-porous will suffice. With respect to coating, a great variety such as plastic, metallic, and vitreous substrates can be used. After casting, the film or coating can be air dried at ambient temperatures or force dried at temperatures of about 50° to about 250° F. 100° F. to 150° F. is a preferred temperature range for force drying. A remarkable result of the use of hexafluorobenzene as a solvent is that the hexafluorobenzene can be removed by drying to less than 1% by weight, i.e., practically no solvent remains; whereas, prior art solvents can only be removed to about 5% to about 10% by weight. The result is a film or coating of decidedly higher quality having low extractability and superior resistance to permeation.

The following examples, in which parts and percentages are by weight, are illustrative of the invention.

EXAMPLE I 5 parts of a copolymer consisting essentially of 96.57% CTFE and 3.43% vinylidene fluoride (M.W. 451,500) was mixed with 95 parts of $C_6F_6$ for 66 hours at room temperature (about 20° C. after which time solution was complete. Casting was achieved by applying the solution to a Ferroplate and air drying. A clear, continuous, non-porous film was removed. Ferroplate is chrome plated steel.

EXAMPLE II

The same procedure was followed and the same results were obtained as in Example I except that a terpolymer was used which consisted essentially of 96.45% CTFE, 0.95% vinylidene fluoride, and 2.60% tetrafluoroethylene (M.W.195,000); the terpolymer and $C_6F_6$ were mixed for one hour at 60° C.; and a 2 mil film was obtained.

EXAMPLE III

The same procedure was followed and the same results were obtained as in Example I except that a copolymer was used which consisted essentially of 96.46% CTFE and 3.54% vinylidene fluoride (M.W. 212,000) and a 5 mil film was obtained.

EXAMPLE IV

The same procedure was followed and the same results were obtained as in Example I except that a terpolymer was used which consisted essentially of 96.27 CTFE, 1.13% vinylidene fluoride, and 2.60% tetrafluoroethylene and the terpolymer and hexafluorobenzene were mixed four hours at 70° C.

EXAMPLE V

The same procedure was followed and the same results were obtained as in Example I except that a copolymer was used which consisted essentially of 98% CTFE and 2% vinylidene fluoride (M.W. 360,000) and the copolymer and $C_6F_6$ were mixed for one hour at 60° C.

EXAMPLE VI

The same procedure was followed and the same results were obtained as in Example III except that 4 films were prepared; 2 films, A and B, were cast from a solution of 5 parts copolymer and 95 parts $C_6F_6$ as in Example III and 2 films, C and D, were cast from a solution of 10 parts copolymer and 90 parts $C_6F_6$; films A and C were air dried for one hour at 68° F. and films B and D were oven dried in air for one hour at 150° F.

The films were subjected to infrared analysis to determine $C_6F_6$ retention.

| Film: | Percent $C_6F_6$ retention |
|---|---|
| A | 0.21. |
| B | Not detectable. |
| C | 0.45. |
| D | Not detectable. |

EXAMPLE VII

A solution was prepared as in Example III except that 10 parts of copolymer and 90 parts of $C_6F_6$ were used. The solution was used as a solvent-dope. Two pieces of steel coated with a copolymer of 96.46% CTFE and 3.54% vinylidene fluoride were seamed together with a tape coated with the same copolymer by coating the seam area and the tape with the solvent-dope and joining the seam areas and tape by light pressure at room temperature. After air drying, the seamed coated steel withstood 26 day immersion in 20% nitric acid.

EXAMPLE VIII

The same procedure was followed and the same results were obtained as in Example I except that a copolymer was used which consisted of 79.0% CTFE and 21.0% vinylidene fluoride.

EXAMPLE IX

Solutions were prepared as in Examples II and III except that 20 parts of copolymer and 80 parts of $C_6F_6$ were used. The solutions were used as a solvent-dope for welding 10 mil films prepared from the terpolymer of Example II and 5 mil films prepared from the copolymer of Example III. The weld areas of the films were coated with solvent-dope and joined by light pressure at room temperature. The peel strength of five 10 mil terpolymer film samples ranged from 0.8 to 1.6 pounds per lineal inch. The peel strength of five 5 mil copolymer film samples ranged from 4.5 to 8 pounds per lineal inch.

EXAMPLE X

The same procedure was followed and the same results were obtained as in Example III except that a 0.7 mil film was obtained.

5 samples of the 0.7 mil film were air dried for one hour at 68° F. The tensile strengths ranged from 1280 p.s.i. to 2100 p.s.i. The ultimate elongation ranged from 465 to 650%.

The same 5 samples were then air dried in an oven for one hour at 100° F. The tensile strength averaged 700 p.s.i. and the ultimate elongation ranged from 60 to 75%.

EXAMPLE XI

The solution of Example III was coated on both a polyethylene substrate and a sandblasted steel panel. The coat was dried for one hour at 68° F. followed by oven drying for one hour at 100° F. A smooth continuous coating was formed on both substrates.

We claim:
1. A method for casting unsupported films from a solution comprising the following steps:
   (a) dissolving a solute selected from the group consisting of a copolymer consisting essentially of chlorotrifluoroethylene and vinylidene fluoride and a terpolymer consisting essentially of chlorotrifluoro- ethylene, vinylidene fluoride, and tetrafluoroethylene in a solvent, hexafluorobenzene;
(b) depositing the solution on a substrate;
(c) drying the solution to remove the hexafluorobenzene; and
(d) removing the film from the substrate.

2. A method for casting coatings on a substrate from a solution comprising the following steps:
(a) dissolving a solute selected from the group consisting of a copolymer consisting essentially of chlorotrifluoroethylene and vinylidene fluoride and a terpolymer consisting essentially of chlorotrifluoroethylene, vinylidene fluoride, and tetrafluoroethylene in a solvent, hexafluorobenzene;
(b) depositing the solution on the substrate; and
(c) drying the solution to remove the hexafluorobenzene.

3. The method as defined in claim 1 wherein the solute ranges from about 1% to about 60% by weight of the solution.

4. The method as defined in claim 2 wherein the solute ranges from about 1% to about 60% by weight of the solution.

5. The method as defined in claim 1 wherein the solute is a copolymer consisting essentially of about 60% to 99.5% by weight of chlorotrifluoroethylene and about 0.5% to about 40% by weight of vinylidene fluoride.

6. The method as defined in claim 1 wherein the solute is a terpolymer consisting essentially of at least about 60% by weight of chlorotrifluoroethylene, at least about 0.5% by weight of vinylidene fluoride, and about 1% to about 5% by weight of tetrafluoroethylene.

7. The method as defined in claim 2 wherein the solute is a copolymer consisting essentially of about 60% to 99.5% by weight of chlorotrifluoroethylene and about 0.5% to about 40% by weight of vinylidene fluoride.

8. The method as defined in claim 2 wherein the solute is a terpolymer consisting essentially of at least about 60% by weight of chlorotrifluoroethylene, at least about 0.5% by weight of vinylidene fluoride, and about 1% to about 5% by weight of tetrafluoroethylene.

9. A method for seaming materials with tape, both of which are coated with a copolymer consisting essentially of chlorotrifluoroethylene and vinylidene fluoride comprising the following steps:
(a) coating the seaming areas of the coated materials and the tape with a solution of a solute, a member selected from the group consisting of a copolymer consisting essentially of chlorotrifluoroethylene and vinylidene fluoride and a terpolymer consisting essentially of chlorotrifluoroethylene, vinylidene fluoride, and tetrafluoroethylene, and a solvent, hexafluorobenzene;
(b) pressing the tape against the seaming areas; and
(c) drying the solution to remove the hexafluorobenzene.

10. A method for seaming materials with tape, both of which are coated with a terpolymer consisting essentially of chlorotrifluoroethylene, vinylidene fluoride, and tetrafluoroethylene comprising the following steps:
(a) coating the seaming areas of the coated materials and the tape with a solution of a solute, a member selected from the group consisting of a copolymer consisting essentially of chlorotrifluoroethylene and vinylidene fluoride and a terpolymer consisting essentially of chlorotrifluoroethylene, vinylidene fluoride, and tetrafluoroethylene, and a solvent, hexafluorobenzene;
(b) pressing the tape against the seaming areas; and
(c) drying the solution to remove the hexafluorobenzene.

11. A method for welding films comprising a copolymer consisting essentially of chlorotrifluoroethylene and vinylidene fluoride comprising the following steps;
(a) coating the welding areas of the films with a solution of a solute, a member selected from the group consisting of a copolymer consisting essentially of chlorotrifluoroethylene and vinylidene fluoride and a terpolymer consisting essentially of chlorotrifluoroethylene, vinylidene fluoride, and tetrafluoroethylene, annd a solvent, hexafluorobenzene;
(b) pressing the welding areas together; and
(c) drying the solution to remove the hexafluorobenzene.

12. A method for welding films comprising a terpolymer consisting essentially of chlorotrifluoroethylene, vinylidene fluoride, and tetrafluoroethylene comprising the following steps:
(a) coating the welding areas of the films with a solution of a solute, a member selected from the group consisting of a copolymer consisting essentially of chlorotrifluoroethylene and vinylidene fluoride and a terpolymer consisting essentially of chlorotrifluoroethylene, vinylidene fluoride, and tetrafluoroethylene, and a solvent, hexafluorobenzene;
(b) pressing the welding areas together;and
(c) drying the solution to remove the hexafluorobenzene.

13. A solution adapted for casting unsupported films and coatings comprising:
(a) a solute selected from the group consisting of a copolymer consisting essentially of chlorotriffuoroethylene and vinylidene fluoride and a terpolymer consisting essentially of chlorotrifluoroethylene, vinylidene fluoride, and tetrafluoroethylene; and
(b) a solvent, hexafluorobenzene.

14. The solution as defined in claim 13 wherein the solute ranges from about 1% to about 60% by weight of the solution.

15. The solution as defined in claim 13 wherein the solute is a copolymer consisting essentially of about 60% to 99.5% by weight of chlorotrifluoroethylene and about 0.5% to about 40% by weight of vinylidene fluoride.

16. The solution as defined in claim 13 wherein the solute is a terpolymer consisting essentially of at least about 60% by weight of chlorotrifluoroethylene, at least about 0.5% by weight of vinylidene fluoride, and about 1% to about 5% by weight of tetrafluoroethylene.

References Cited
UNITED STATES PATENTS

| | | | |
|---|---|---|---|
| 2,752,332 | 6/1956 | Honn | 117—161 X |
| 2,770,606 | 11/1956 | Teeters et al. | 260—33.8 X |
| 2,863,844 | 12/1958 | Fuchs et al. | 260—33.8 X |
| 2,866,721 | 12/1958 | Hetherington | 117—161 |
| 2,940,874 | 6/1960 | Barnes | 117—161 |
| 3,053,818 | 9/1962 | Honn et al. | 260—80.5 |
| 3,075,939 | 1/1963 | Bauer et al. | 117—161 X |

EARL M. BERGERT, *Primary Examiner.*

UNITED STATES PATENT OFFICE
CERTIFICATE OF CORRECTION

Patent No. 3,397,103                                  August 13, 1968

Julian H. Kushnick et al.

It is certified that error appears in the above identified patent and that said Letters Patent are hereby corrected as shown below:

Column 1, lines 54 and 55, "orthochlorobenzotrifluoride and orthobenzotrifluoride" should read -- orthodichlorotrifluorotoluene and orthochlorobenzotrifluoride --; line 68, "systeem" should read -- system --. Column 2, line 17, "copolymeer" should read -- copolymer --. Column 3, line 41, "(about 20° C." should read -- (about 20° C.) --; line 64, "96.27" should read -- 96.27% --; line 66, after "mixed" insert -- for --. Column 6, line 37, "chlorotriffuoro-" should read -- chlorotrifluoro- --.

Signed and sealed this 13th day of January 1970.

(SEAL)
Attest:

Edward M. Fletcher, Jr.                         WILLIAM E. SCHUYLER, JR.
Attesting Officer                                          Commissioner of Patents